(12) United States Patent
Suzuki et al.

(10) Patent No.: US 11,715,185 B2
(45) Date of Patent: Aug. 1, 2023

(54) IMAGE PROCESSING APPARATUS, IMAGE PROCESSING METHOD, AND STORAGE MEDIUM FOR OBTAINING IMAGE EVALUATION VALUE DISTRIBUTION CORRESPONDING TO AN IMAGE

(71) Applicant: CANON KABUSHIKI KAISHA, Tokyo (JP)

(72) Inventors: Asahi Suzuki, Kanagawa (JP); Takashi Sasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 17/205,594

(22) Filed: Mar. 18, 2021

(65) Prior Publication Data
US 2021/0304375 A1 Sep. 30, 2021

(30) Foreign Application Priority Data
Mar. 31, 2020 (JP) .................... 2020-063807

(51) Int. Cl.
*G06T 5/00* (2006.01)
*G06T 5/50* (2006.01)

(52) U.S. Cl.
CPC .............. *G06T 5/009* (2013.01); *G06T 5/50* (2013.01); *G06T 2207/20021* (2013.01); *G06T 2207/20208* (2013.01); *G06T 2207/20224* (2013.01); *G06T 2207/30201* (2013.01)

(58) Field of Classification Search
CPC ............. G06T 2207/10028; G06T 7/11; G06T 2207/20021; G06T 2207/20224; H04N 2013/0081
See application file for complete search history.

(56) References Cited

U.S. PATENT DOCUMENTS

| | | | |
|---|---|---|---|
| 2017/0084038 A1* | 3/2017 | Dane | G06T 7/20 |
| 2018/0336670 A1* | 11/2018 | Onuki | G06T 5/007 |
| 2019/0012796 A1* | 1/2019 | Yamasaki | G06T 7/12 |
| 2019/0174073 A1* | 6/2019 | Onuki | H04N 5/2621 |

FOREIGN PATENT DOCUMENTS

| | | |
|---|---|---|
| JP | 2008015754 A | 1/2008 |
| JP | 2014068279 A | 4/2014 |
| JP | 2016052096 A | 4/2016 |

* cited by examiner

*Primary Examiner* — Li Liu
(74) *Attorney, Agent, or Firm* — Canon U.S.A., Inc. IP Division

(57) ABSTRACT

An apparatus includes a map obtaining unit configured to obtain image evaluation value distribution corresponding to an image as an image evaluation value map, a map generation unit configured to generate a first subject region map including a subject region extracted from the image using the image evaluation value map, and a processing unit configured to perform correction processing on the image using at least any one of the first subject region map and a second subject region map generated without using the image evaluation value map, wherein the processing unit calculates a difference between the first subject region map and the second subject region map and performs correction processing on the image using the second subject region map more than the first subject region map as the difference is higher.

17 Claims, 11 Drawing Sheets

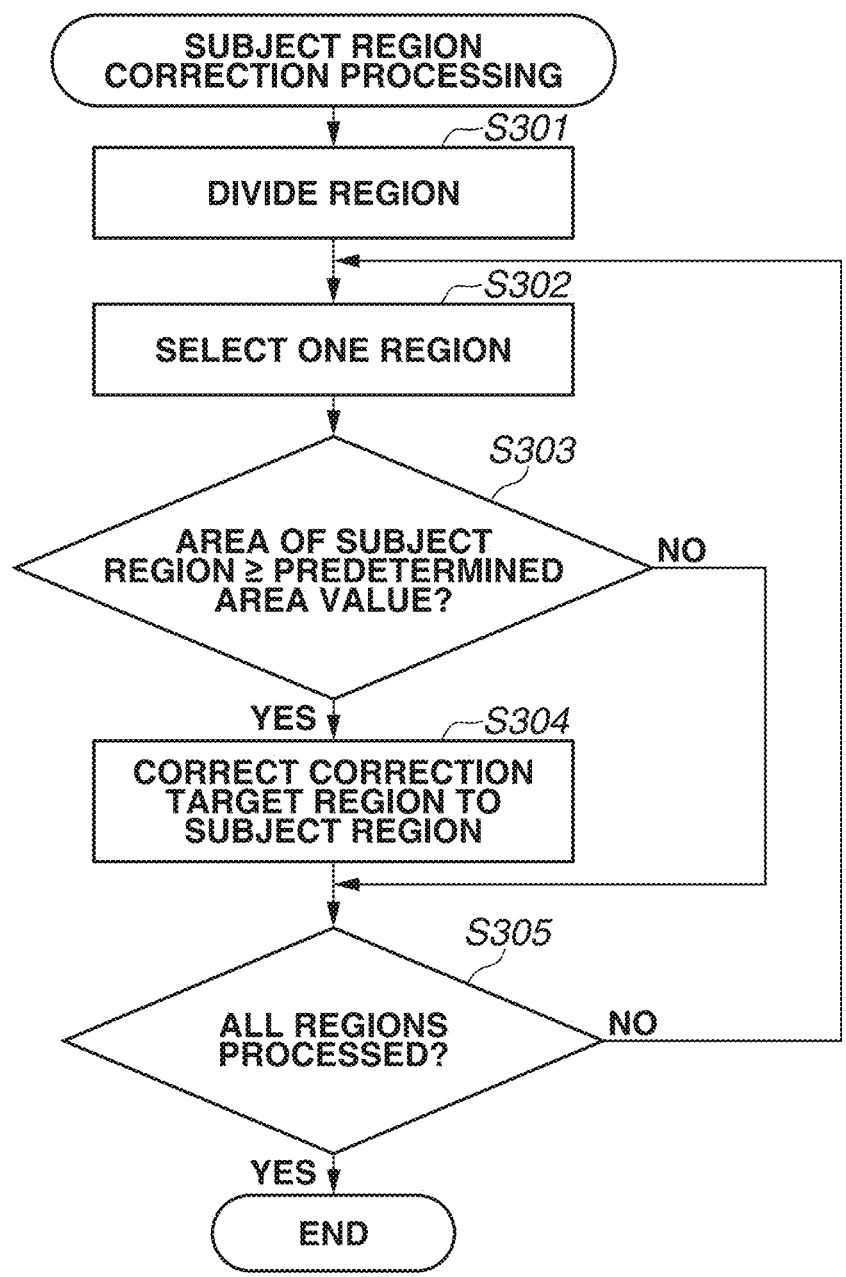

IMAGE PROCESSING APPARATUS, IMAGE PROCESSING METHOD, AND STORAGE MEDIUM FOR OBTAINING IMAGE EVALUATION VALUE DISTRIBUTION CORRESPONDING TO AN IMAGE

BACKGROUND OF THE DISCLOSURE

Field of the Disclosure

The aspect of the embodiments relates to an image processing technique with respect to a captured image.

Description of the Related Art

A technique for detecting subject regions from a captured image and applying correction processing to the detected subject regions is conventionally known. For example, a technique such as relighting processing is known, which corrects brightness by applying an effect of irradiating a detected subject region with virtual light. The relighting processing brightens a dark region such as a shadow caused by ambient light, so that a better image can be obtained.

On the other hand, Japanese Patent Application Laid-Open No. 2016-52096 discusses an image processing apparatus that performs correction on a subject region in an infrared image using a skin color region in a red-green-blue (RGB) image.

However, according to the technique discussed in Japanese Patent Application Laid-Open No. 2016-52096, the correction is performed using color information, so that the correction cannot be properly performed in a case where a background includes a color similar to the subject. Accordingly, the corrected subject region becomes unnatural (i.e. an unnatural artifact is generated).

SUMMARY OF THE DISCLOSURE

According to an aspect of the embodiments, an apparatus includes at least one processor and at least one memory coupled to the at least one processor storing instructions that, when executed by the at least one processor, cause the at least processor to function as: a map obtaining unit configured to obtain image evaluation value distribution corresponding to an image as an image evaluation value map, a map generation unit configured to generate a first subject region map including a subject region extracted from the image using the image evaluation value map, and a processing unit configured to perform correction processing on the image using at least any one of the first subject region map and a second subject region map generated without using the image evaluation value map, wherein the processing unit calculates a difference between the first subject region map and the second subject region map and performs correction processing on the image using the second subject region map more than the first subject region map as the difference is higher.

Further features of the disclosure will become apparent from the following description of exemplary embodiments with reference to the attached drawings.

BRIEF DESCRIPTION OF THE DRAWINGS

FIG. 3 is a flowchart illustrating subject region correction processing.

DESCRIPTION OF THE EMBODIMENTS

Figure 1:
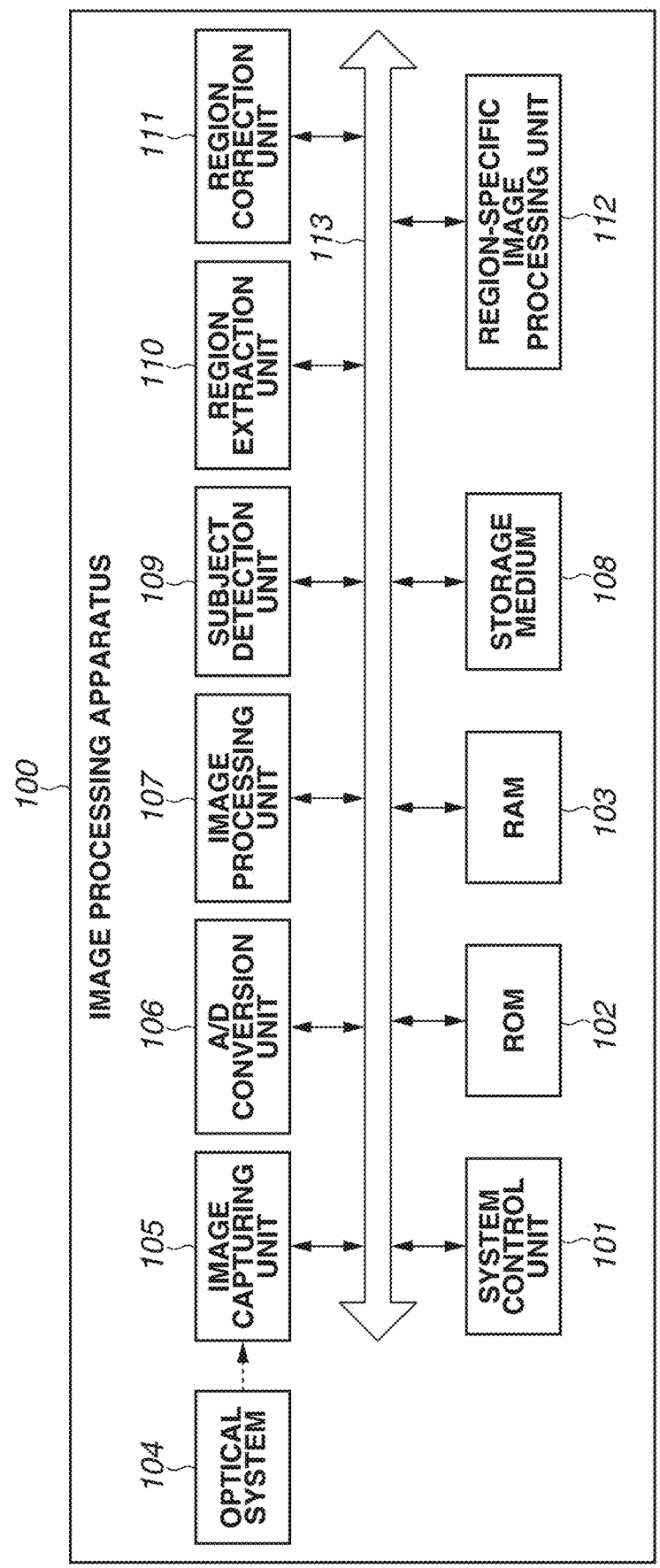
FIG. 1 is a block diagram illustrating a functional configuration of an image processing apparatus.

Various exemplary embodiments of the disclosure will be described in detail below with reference to the attached drawings. The disclosure is not limited to the following exemplary embodiments and can be modified in various ways without departing from the scope of the disclosure. Further, in the drawings described below, components having the same functions are denoted by the same reference numerals, and the description thereof may be omitted or simplified.

FIG. 1 is a block diagram schematically illustrating an example of a functional configuration in a case where an image processing apparatus 100 according to a first exemplary embodiment is applied to, for example, an image capturing apparatus (digital camera).

As illustrated in FIG. 1, the image processing apparatus 100 according to the present exemplary embodiment includes a system control unit 101, a read-only memory (ROM) 102, and a random access memory (RAM) 103. The image processing apparatus 100 according to the present exemplary embodiment further includes an optical system 104, an image capturing unit 105, an analog-to-digital (A/D) conversion unit 106, an image processing unit 107, a storage medium 108, a subject detection unit 109, a region extraction unit 110, a region correction unit 111, a region-specific image processing unit 112, and a bus 113. Each block except the optical system 104 is connected to the bus 113.

The system control unit 101 controls the entire image processing apparatus 100 and is, for example, a central processing unit (CPU). The system control unit 101 controls an operation of each block included in the image processing apparatus 100 by reading a program according to the present exemplary embodiment from the ROM 102, loading the program into the RAM 103, and executing the program.

The ROM 102 is a rewritable nonvolatile memory and, for example, a flash ROM is used. The ROM 102 stores parameters and the like for an operation of each block in addition to an operation program for each block included in the image processing apparatus 100.

The RAM 103 is a rewritable volatile memory used as a temporary storage area for data output in the operation of each block included in the image processing apparatus 100. The system control unit 101 and the image processing unit 107 use the RAM 103 as a work memory.

The optical system 104 forms an optical image of a subject and the like on an imaging plane of the image capturing unit 105. The optical system 104 includes, for example, a fixed lens, a magnification lens for changing a focal length, and a focus lens for adjusting the focus. The optical system 104 further includes an aperture to adjust an amount of light at the time of imaging by adjusting an aperture diameter of the optical system with the aperture.

The image capturing unit 105 is an image capturing element such as a charge coupled device (CCD) image sensor and a complementary metal oxide semiconductor (CMOS) image sensor. The image capturing unit 105 performs photoelectric conversion on the optical image formed on the image capturing element by the optical system 104 and outputs the obtained imaging signal (analog signal) to the A/D conversion unit 106.

The A/D conversion unit 106 applies A/D conversion processing to the input imaging signal and outputs the obtained image data to the RAM 103 to store the image data therein.

The image processing unit 107 performs image processing on the image data stored in the RAM 103. More specifically, the image processing unit 107 performs various kinds of image processing such as white balance adjustment, color interpolation, reduction/enlargement, filtering, and generation of distance information for each pixel. Then, the image processing unit 107 stores the image data subjected to the image processing in the RAM 103 or the storage medium 108.

According to the present exemplary embodiment, the image processing unit 107 performs map obtaining processing for obtaining an image evaluation value map representing image evaluation value distribution corresponding to the captured image based on the distance information of each pixel. According to the present exemplary embodiment, the image processing unit 107 generates defocus amount distribution representing focus information on an entire surface of the image based on the distance information of each pixel and obtains the defocus amount distribution as the image evaluation value map representing the image evaluation value distribution. According to the present exemplary embodiment, for example, a technique for obtaining focus information of an entire surface of an image from a phase difference of the image, which is discussed in Japanese Patent Application Laid-Open No. 2008-15754, is used as a technique for calculating a defocus amount, but it is not limited thereto. According to Japanese Patent Application Laid-Open No. 2008-15754, the defocus amount distribution is calculated based on an amount of deviation between two pixel data pieces while relatively shifting a pair of pieces of pixel data included in a minute block.

The storage medium 108 is, for example, a memory card attachable to and detachable from the image processing apparatus 100. The storage medium 108 stores image data processed by the image processing unit 107 and temporarily stored in the RAM 103, image data subjected to A/D conversion in the A/D conversion unit 106, and the like as recorded images.

The subject detection unit 109 detects a position and an orientation of a specific subject from the image processed by the image processing unit 107. For example, the subject detection unit 109 detects a position and an orientation of a face or an organ as the position and the orientation of the specific subject.

The region extraction unit 110 extracts a subject region from the image processed by the image processing unit 107. For example, the region extraction unit 110 extracts the subject region based on the image evaluation value map of the distance information of the image and a detection position of the face and the like detected by the subject detection unit 109. Then, the region extraction unit 110 performs map generation processing for generating a first subject region map based on the subject region extracted using the image evaluation value and the like. The extraction processing of the subject region and the generation processing of the first subject region map by the region extraction unit 110 will be described in detail below.

The region correction unit 111 performs correction processing on the subject region extracted by the region extraction unit 110. While details will be described below, in the case of the present exemplary embodiment, the region correction unit 111 performs map correction processing as described below on the first subject region map generated by the region extraction unit 110. Further, the region correction unit 111 evaluates a difference between the first subject region map subjected to the map correction processing and a second subject region map generated in advance without using the image evaluation value map. Then, the region correction unit 111 performs processing for generating a third subject region map using the second subject region map more preferentially than the first subject region map as the difference is higher.

While the details will be described below, the second subject region map is a subject region map generated by applying a model generated in advance based on the position and the orientation of the face or the organ detected by the subject detection unit 109. Further, while the details will be described below, the difference according to the first exemplary embodiment is an area value of the region obtained by excluding the subject region in the second subject region map from the first subject region map corrected by the map correction processing. The details of the map correction processing for the first subject region map and the second subject region map are described below.

The region-specific image processing unit 112 performs image correction for each region using at least one of the first subject region map generated using the image evaluation value map and the second subject region map generated without using the image evaluation value map. In other words, in the case of the present exemplary embodiment, the region-specific image processing unit 112 performs the image processing for each region using the third subject region map generated by the region correction unit 111. As the image correction processing for each region, in one embodiment, there can be region-specific image correction processing such as relighting for adjusting brightness only for a specific region in the subject region.

The bus 113 connects blocks in the image processing apparatus 100, and the blocks exchange a signal with one another via the bus 113.

Figure 2A:
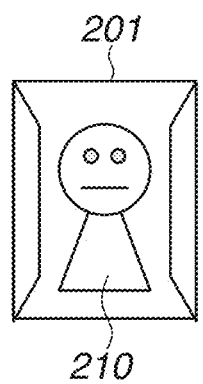
FIGS. 2A to 2E illustrate an example of an image and maps.

FIG. 2A illustrates an example of an image 201 subjected to the image processing by the image processing unit 107. The image 201 is an image in which a person 210 is captured as a subject in a room. Further, the image 201 is an image including distance information in each pixel.

Figure 2B:
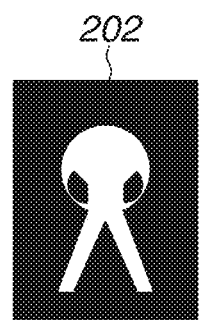

FIG. 2B illustrates a subject region map 202 obtained by the region extraction unit 110 extracting the subject region based on the distance information of the image 201. According to the present exemplary embodiment, the subject region map 202 is an example of the first subject region map generated using the image evaluation value map of the defocus amount distribution based on the distance information of each pixel in the image. The subject region map 202 is, for example, a map represented by 8-bit binary values of 255 for white and 0 for black and a white portion is used as a subject region label representing the subject region, and a black portion is used as a non-subject label representing an outside of the subject region (non-subject region). As described above, the subject region map is classified into at least two label regions of a subject label represented by the white portion and a non-subject label represented by the black portion.

A distance in a low-contrast region such as cheeks of a face and monochromatic clothes of a person may not be accurately measured. Thus, in order to determine such a low-contrast region, the region correction unit 111 calculates reliability with respect to the distance information of each pixel, i.e., the image evaluation value of each pixel at the time of generation of the first subject region map. For example, the region correction unit 111 calculates the reliability of the image evaluation value (distance information) for each pixel based on dispersion of luminance values of pixels in the image. The region correction unit 111 generates a reliability map representing reliability distribution of the image evaluation value for each pixel.

Figure 2C:
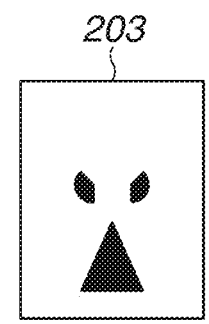

FIG. 2C illustrates a reliability map 203 representing the reliability distribution of the image evaluation values for pixels calculated by the region correction unit 111. The reliability map 203 is, for example, a map represented by 8-bit binary values of 255 for white and 0 for black, similar to the subject region map. In the reliability map 203, the white portion is used as a high reliability label representing a region with high reliability, for example, more than or equal to a threshold value, and the black portion is used as a low reliability label representing a region with low reliability less than the threshold value.

Further, the region correction unit 111 does not determine the black portion with the low reliability label in the reliability map 203 as the subject region. In other words, the region correction unit 111 performs the map correction processing on the region with the low reliability label in the reliability map so as not to determine to be the subject region with respect to the first subject region map generated by extracting the subject region based on the image evaluation value map. For example, in a case of the reliability map 203 illustrated in FIG. 2C, the region with the low reliability label represented by the black portion is not determined as the subject region. As a result, the first subject region map will be the subject region map 202 as illustrated in FIG. 2B in which the region with the low reliability label, which is the black portion in the reliability map 203, is corrected to be a non-subject label. Thus, the first subject region map corrected by the region correction unit 111 is generated as the subject region map 202 including some black regions (like holes) in the region of the person as illustrated in FIG. 2B. However, it is not desirable to use the subject region map 202 that includes some holes in the region of the person as in FIG. 2B in a case where the region-specific image processing is performed by the region-specific image processing unit 112.

Thus, the region correction unit 111 according to the first exemplary embodiment performs correction processing on the subject region. Processing for correcting, to the subject region, the black region determined to be the non-subject region in the subject region map 202 described above (i.e., filling the hole in the subject region map 202) is described below as an example of subject region correction processing.

FIG. 3 is a flowchart illustrating a procedure of the subject region correction processing by the region correction unit 111 according to the first exemplary embodiment.

Figure 2D:
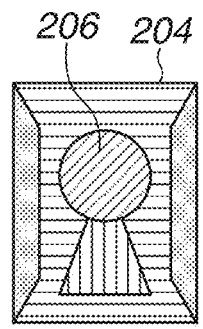

First, in step S301, the region correction unit 111 performs region division on the image 201 based on at least one of color information and luminance information of the image 201. According to the present exemplary embodiment, the region division of the image is performed using a method discussed in Japanese Patent Application Laid-Open No. 2014-68279. FIG. 2D illustrates a region division result 204 after the region division processing is performed on the image 201 by the region correction unit 111. In the region division result 204, each divided region is labeled. A divided region 206 in FIG. 2D is the region labeled as a divided region corresponding to a face of the person 210 in FIG. 2A. In this way, the region correction unit 111 performs the region division processing for dividing the image into a plurality of regions and obtains the region division result in which each of these divided regions is labeled.

At this time, the separation performance of the region division may be deteriorated if the image 201 is, for example, at least one of a low color saturation image and a low luminance image. Accordingly, in a case where the image 201 is the low color saturation image or the low luminance image, the region correction unit 111 adjusts the color saturation and the luminance of the image 201 by performing tone curve correction processing thereon prior to the region division processing. In other words, the region correction unit 111 determines whether the image is at least one of the low luminance image and the low color saturation image based on either of color distribution information and luminance distribution information of the image and performs the tone curve correction on the image in a case where the image is determined to correspond to the low luminance image or the low color saturation image.

Further, for example, in a case where the image 201 is divided into regions, a specific subject region in the image 201 may be divided minutely. In order to prevent a specific subject region from being divided minutely, the region correction unit 111 may determine whether to apply the tone curve correction processing depending on an area of the subject region or an area of the specific region. For example, the region correction unit 111 determines whether to apply the tone curve correction processing depending on an area of a face region of the person 210 in order to prevent the face region of the person 210 being divided minutely by the region division and a division label of the face region from being divided minutely in the image 201. For example, the region correction unit 111 performs applicability determination processing for preventing the tone curve correction processing from being applied thereto in a case where the area of the face region of the person 210 is greater than or equal to a predetermined area threshold value. In other words, the region correction unit 111 does not apply the tone curve correction in a case where the area of the subject region in the image or the area of the specific region in the subject region is greater than or equal to the predetermined area threshold value. In this way, the specific subject region can be prevented from being divided minutely.

Further, for example, in a case where a subject is limited to a person, the region correction unit 111 can properly extract a divided region included in the subject region based on skin color of a face and other portions in the region division. In this case, the region correction unit 111 extracts color information of the face of the person as the subject and extracts the region including the color information in advance. The subject is not limited to a person. For example, if a car is a subject, color information of a car body may be extracted, and a region including the color information may be extracted in advance in a similar manner. In other words, the region correction unit 111 extracts the color of a specific subject, divides a region depending on the color of the subject, and then divides a remaining region. For example, if the subject is a person, the region correction unit 111 extracts the skin color of the person as the subject, divides the region depending on the skin color, and then divides the remaining region. In this way, the subject region including the skin color of the face and other portions can be properly divided.

Next, in step S302, the region correction unit 111 selects a divided region from the divided regions divided by the region division processing in step S301. In the case of the present exemplary embodiment, it is assumed that the region correction unit 111 selects, for example, the divided region 206 corresponding to the face of the person 210 as the subject from the region division result 204 in FIG. 2D.

Next, in step S303, the region correction unit 111 determines whether the divided region selected in step S302 includes an area value of the subject region more than or equal to a predetermined area value. In a case where it is determined that the selected divided region includes the area value of the subject region more than or equal to the predetermined area value (YES in step S303), the region correction unit 111 advances the processing to step S304. On the other hand, in a case where it is determined that the area value of the subject region is not included more than or equal to the predetermined area value (less than the predetermined area value) (NO in step S303), the region correction unit 111 advances the processing to step S305.

In the case of the divided region 206 illustrated in FIG. 2D, the divided region selected in step S302 includes the area value of the subject region more than or equal to the predetermined area value (YES in step S303), so that the processing proceeds to step S304. In the case of the present exemplary embodiment, the predetermined area value is determined based on the area of the divided region as a determination target. In other words, the predetermined area value at this time can be changed based on the area of the divided region.

Figure 4:
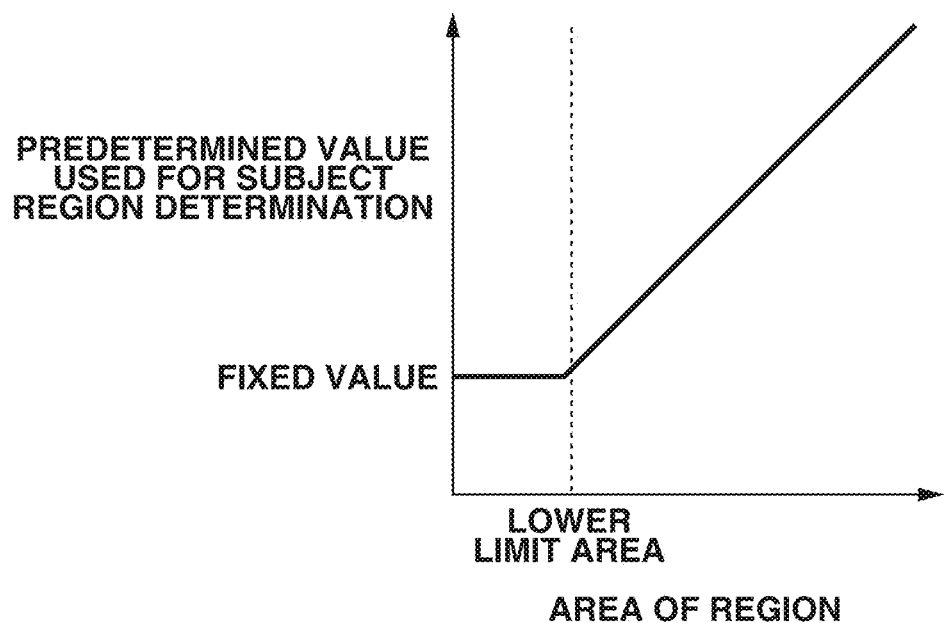
FIG. 4 is a graph illustrating a relationship between a predetermined lower limit area and a fixed value used for subject region determination.

Further, for example, in a case where the area of the divided region is less than or equal to a predetermined lower limit value, determination becomes sensitive to a protrusion of the region of about several pixels. Therefore, in one embodiment, the predetermined area value used for determining the area value of the subject region can be a fixed value only in a case where the area of the divided region is less than or equal to the predetermined lower limit value as illustrated in a graph in FIG. 4. In other words, the predetermined area value used for determining the area value of the subject region may be the fixed value in a case where the area of the divided region is less than or equal to the predetermined lower limit value. In the graph in FIG. 4, a horizontal axis represents the area of the divided region, and a vertical axis represents the predetermined area value used for determining the subject region. According to the graph in FIG. 4, in a case where the area of the divided region is larger than the predetermined lower limit value, the predetermined area value used for determining the subject region is set to a higher value as the area of the divided region increases. On the other hand, in a case where the area of the divided region is less than or equal to the predetermined lower limit value, the predetermined area value used for determining the subject region is set to the fixed value.

In step S304, the region correction unit 111 corrects the region determined to include the area value more than or equal to the predetermined area value in the divided region selected in step S302 so as to be included in the subject region. The region to be corrected at this time (correction target region) is a region with low reliability in the above-described reliability map from among the divided regions determined to include the subject region more than the predetermined area value. The correction target region that has a non-subject label in the subject region map and has high reliability in the reliability map is likely to be a region with a different distance from the subject, such as a background. Thus, it is not necessary to correct the correction target region to the subject region. On the other hand, in the reliability map 203, the region with low reliability corresponding to the divided region 206 is highly likely to be the subject region, so that the correction target region is corrected to the subject region.

Further, for example, in a case where a ratio of the divided region selected in step S302 to the image is too high, there is a high possibility that a region that does not need to be corrected will be corrected. For this reason, in a case where the area of the divided region selected in step S302 is more than or equal to a predetermined upper limit value, processing for correcting the correction target region to the subject region is not performed. In other words, the region correction unit 111 does not correct the correction target region in a case where the area of the divided region is more than or equal to the predetermined upper limit value. The predetermined upper limit value may be determined depending on the area of the image or depending on the area of the face of the person as the subject.

In step S305, the region correction unit 111 determines whether the processing is completed for all the divided regions. In a case where it is determined that the processing is not completed (NO in step S305), the region correction unit 111 returns the processing to step S302 and selects a divided region not yet processed. On the other hand, in step S305, in a case where it is determined that the processing is completed (YES in step S305), the region correction unit 111 terminates the processing in the flowchart in FIG. 3.

Figure 2E:
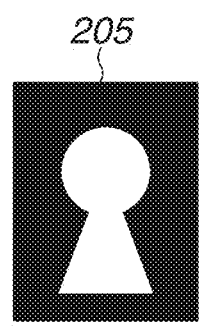

A corrected subject region map 205 as illustrated in FIG. 2E is obtained by the correction processing on the subject region map as described above.

However, the above-described method is a correction processing based on the color information and the luminance information, so that if there is an object with a similar color and luminance to the subject near the subject, the correction processing may be erroneously performed.

Figures 5A, 5B, 5C:
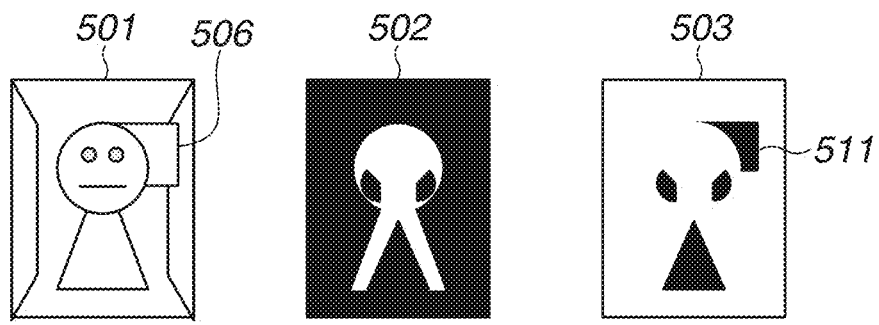
FIGS. 5A to 5E illustrate an example of an image in which over-correction occurs in maps, and the maps.
Figures 5D, 5E:
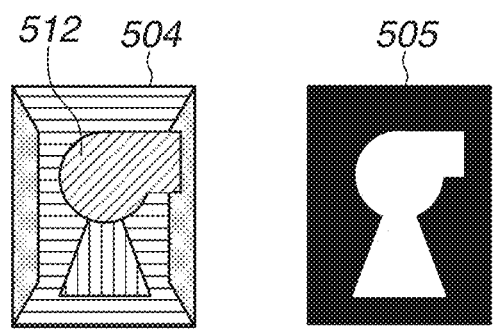

This case is described with reference to FIGS. 5A to 5E. FIG. 5A illustrates an image 501 similar to the image 201 in FIG. 2A. FIG. 5B illustrates a first subject region map 502 similar to the subject region map 202 in FIG. 2B. FIG. 5C illustrates a reliability map 503 similar to the reliability map 203 in FIG. 2C. Further, FIG. 5D illustrates a region division result 504 similar to the region division result 204 in FIG. 2D, and FIG. 5E illustrates a corrected subject region map 505 similar to the corrected subject region map 205 in FIG. 2E. Generation methods are respectively similar to the methods described in FIGS. 2A to 2E, so that the descriptions thereof are omitted.

The examples in FIGS. 5A to 5E are different from the examples described above in FIGS. 2A to 2E in that an object 506 having the same color as the subject and a low contrast exists around the subject. Since the object 506 has the low contrast, a region 511 corresponding to the object 506 is a low-reliability region in the reliability map 503. Further, since the object 506 has the same color as the subject, a divided region 512 in which the subject (the region of the face) and the region of the object 506 are combined is generated in the region division result 504. Then, the corrected subject region map 505 becomes a map as illustrated in FIG. 5E. In this case, if the region-specific image processing unit 112 in the later stage performs region-specific image processing based on the corrected subject region map 505, the subject region is not properly corrected, and an unnatural artifact is generated.

Therefore, in the first exemplary embodiment, the region correction unit 111 calculates an over-corrected region as a correction evaluation value for subject region map correction processing at the time of correcting the first subject region map generated using the image evaluation value map. According to the present exemplary embodiment, the correction evaluation value is a difference between the first subject region map and the second subject region map. Further, the region correction unit 111 selects one of the first subject region map in which the subject region is corrected as described above and the second subject region map to be used for the region-specific image processing based on the correction evaluation value (difference). In the case of the present exemplary embodiment, the region correction unit 111 generates a third subject region map using the second subject region map more than the first subject region map as the difference between the first subject region map and the second subject region map is larger. In this way, the generation of the unnatural artifact in the image can be reduced in the region-specific image processing.

A procedure of processing in the image processing apparatus 100 according to the first exemplary embodiment for implementing the above-described processing is described with reference to a flowchart in FIG. 6.

In step S601, the region extraction unit 110 generates the first subject region map. The first subject region map is generated based on the subject region extracted by the region extraction unit 110 based on the distance information of the image and the like as described above.

In step S602, the region correction unit 111 generates the second subject region map. In the case of the first exemplary embodiment, the region correction unit 111 generates the second subject region map by applying a model generated in advance based on the position and the orientation of the face or the organ detected by the subject detection unit 109. In the case of the present exemplary embodiment, the model generated in advance is, for example, a humanoid model, but is not limited thereto.

Figure 6:
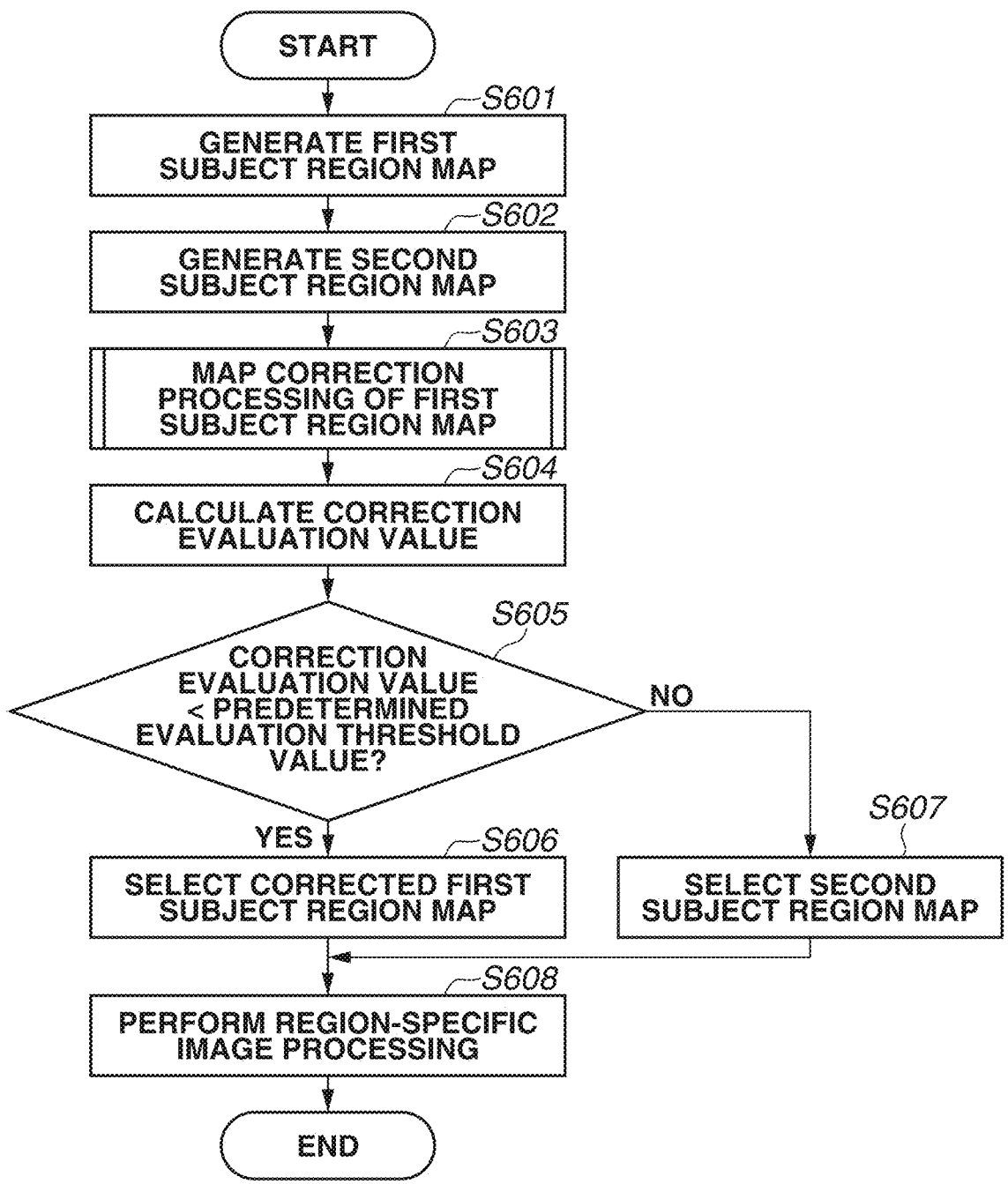
FIG. 6 is a flowchart illustrating image processing according to a first exemplary embodiment.

A processing order of steps S601 and S602 is not limited to the example in FIG. 6. The processing in step S602 may be performed first, and then the processing in step S601 may be performed.

Next, in step S603, the region correction unit 111 performs the map correction processing with respect to the first subject region map. The map correction processing performed at this time is the subject region correction processing described above with reference to the flowchart illustrated in FIG. 3, so that the description thereof is omitted.

Next, in step S604, the region correction unit 111 calculates the correction evaluation value for the map correction processing. According to the present exemplary embodiment, the region correction unit 111 evaluates whether a region needless to be corrected is corrected. In the case of the first exemplary embodiment, the difference between the first subject region map and the second subject region map is calculated as the correction evaluation value for the map correction processing. In the first exemplary embodiment, the difference is the area value of the region after excluding the subject region in the second subject region map from the corrected first subject region map. In the case of the present exemplary embodiment, the area value of the region with the low reliability in the first subject region map and excluding the subject region in the second subject region map from the corrected first subject region map is used as the difference.

Figure 7:
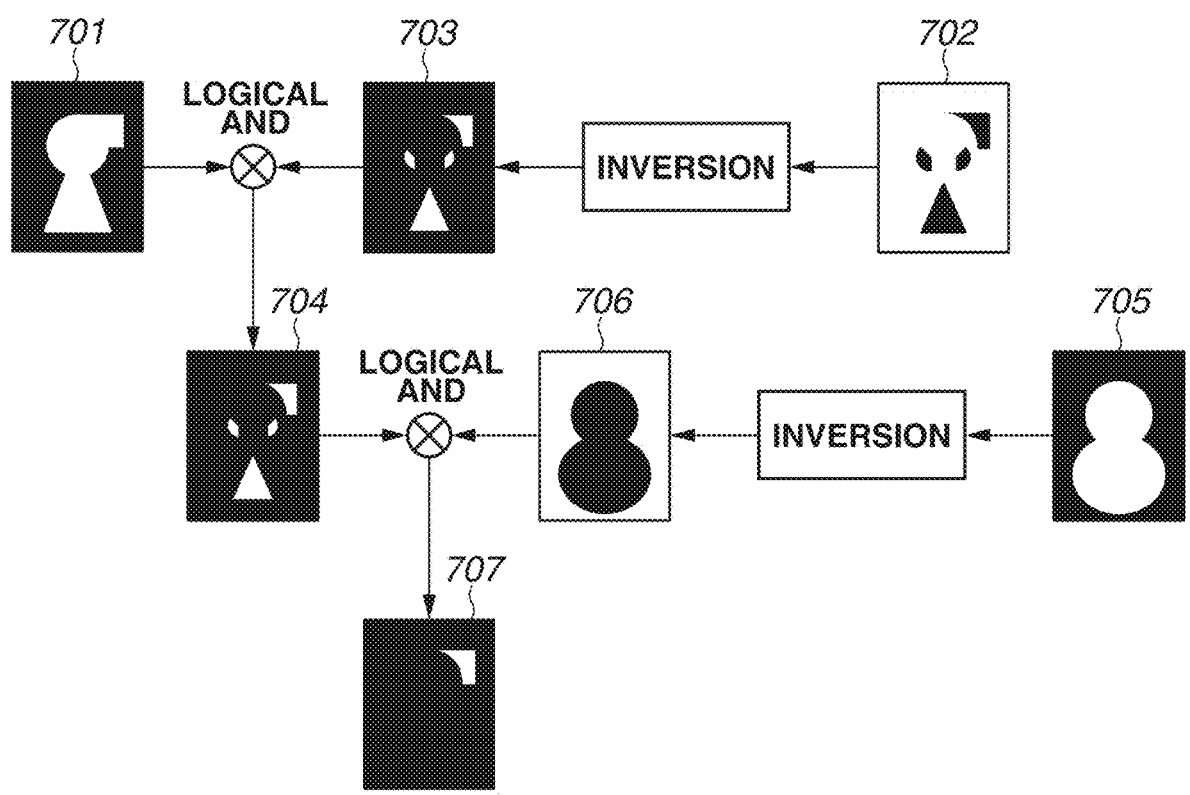
FIG. 7 illustrates calculation of a correction evaluation value according to the first exemplary embodiment.

This processing is described with reference to FIG. 7.

First, the region correction unit 111 calculates the corrected region from a corrected first subject region map 701. The corrected region can be calculated by performing a logical AND operation (AND operation) on a map 703 in which a white portion and a black portion in a reliability map 702 are inverted and the corrected first subject region map 701. In this way, a correction region map 704 representing the corrected region in the corrected first subject region map 701 is obtained.

Next, the region correction unit 111 calculates, from the correction region map 704, the region needless to be corrected. The region can be calculated by performing the logical AND operation on a map 706 in which a white portion and a black portion in a second subject region map 705 are inverted and the correction region map 704. In this way, an over-correction region map 707 representing the over-corrected region can be obtained. In the case of the first exemplary embodiment, an area value of the white portion in the over-correction region map is the correction evaluation value and corresponds to the difference between the first subject region map and the second subject region map.

Next, in step S605, the region correction unit 111 determines whether the correction evaluation value (difference) is less than a predetermined evaluation threshold value. In the first exemplary embodiment, the predetermined evaluation threshold value is a fixed value to be determined depending on the area of the image, but is not limited thereto. For example, the predetermined evaluation threshold value may be determined depending the area of the face of the subject.

In step S605, in a case where the correction evaluation value is determined to be less than the predetermined evaluation threshold value (YES in step S605), it can be determined that the first subject region map is properly corrected, and the region correction unit 111 advances the processing to step S606 and selects the corrected first subject region map. On the other hand, in step S605, in a case where the correction evaluation value is determined to be more than or equal to the predetermined evaluation threshold value (NO in step S605), it can be determined that the first subject region map is not properly corrected, and the region correction unit 111 advances the processing to step S607 and selects the second subject region map. The subject region map obtained by the processing in step S606 or S607 is transmitted as the third subject region map from the region correction unit 111 to the region-specific image processing unit 112 in the later stage.

Then, in step S608, the region-specific image processing unit 112 performs the region-specific image processing based on the third subject region map transmitted from the region correction unit 111. According to the first exemplary embodiment, region-specific relighting is performed as the region-specific image processing, but the region-specific image processing is not limited thereto. For example, the region-specific image processing may be region-specific redevelopment processing, and the like.

As described above, in the image processing apparatus 100 according to the first exemplary embodiment, in a case where the first subject region map is not properly corrected, the second subject region map is used for the region-specific image processing. Therefore, the image processing apparatus 100 according to the first exemplary embodiment can reduce the generation of the unnatural artifact in the image in the region-specific image processing.

According to the first exemplary embodiment, for example, the defocus amount distribution calculated based on the amount of shift between two pieces of pixel data is used as the image evaluation value map, but the image evaluation value map is not limited thereto. For example, the image evaluation value map may be generated based on contrast information distribution obtained from a group of images obtained by successively differentiating a subject distance that is a focus position in a contrast ranging method. Further, for example, the image evaluation value map may be generated based on distance information distribution obtained by converting a defocus amount of an image plane side to a distance value of an object plane side. Furthermore, the ranging method for obtaining the distance information distribution is not limited to a phase difference ranging method, the contrast ranging method, and a passive method based on an image feature. For example, information related to the distance distribution obtained from a ranging sensor module using a time of flight (TOF) method and the like may be used in ranging. For example, the defocus amount distribution using a depth from defocus (DFD) method may be used, which obtains a defocused amount from correlation between two images having different focus and aperture values. Further, for example, infrared distribution information obtained by irradiating an object with infrared light and receiving infrared light reflected by the object may be used as distance information. According to the first exemplary embodiment, the first subject region map is generated using the image evaluation value map based on the distance information, but is not limited thereto. For example, the first subject region map may be generated using probability distribution information of semantic region division. The first subject region map may be generated based on, for example, optical flow distribution information, which maps motion vector distribution, a color label map labelled based on color information, and semantic region division based on machine learning. In other words, according to the present exemplary embodiment, the image evaluation value map may include any of color distribution information, luminance distribution information, defocus amount distribution information, parallax distribution information, distance distribution information, probability distribution information of semantic region division, infrared distribution information, and optical flow distribution information.

According to the first exemplary embodiment, the correction processing of the subject region is performed using at least any one of the color distribution information and the luminance distribution information, but is not limited thereto. For example, the correction processing of the subject region may be performed using any of the information that is not used to generate the first subject region map from the probability distribution information of the semantic region division and the infrared distribution information. In other words, in the first exemplary embodiment, the region division in the correction processing of the subject region may use any of the color distribution information, the luminance distribution information, the probability distribution information of the semantic region division, and the infrared distribution information, which is different from the image evaluation value map.

According to the first exemplary embodiment, the second subject region map is generated by applying the model generated in advance based on the position and the orientation of the face or the organ detected by the subject detection unit 109, but is not limited thereto. For example, the second subject region map may be generated using any one of the probability distribution information of the semantic region division and the infrared distribution information.

An image processing apparatus 100 according to a second exemplary embodiment of the disclosure is described in detail with reference to the attached drawings. The configuration according to the second exemplary embodiment is similar to that in FIG. 1 described above, so that the diagrams and the descriptions of the configuration are omitted.

The image processing apparatus 100 according to the second exemplary embodiment calculates an over-corrected region as a correction evaluation value (difference) in a case where the first subject region map is corrected similar to the first exemplary embodiment. Then, the image processing apparatus 100 according to the second exemplary embodiment performs weighted composition of the corrected first subject region map and the second subject region map generated without using the image evaluation value map based on the correction evaluation value (difference) and uses the weighted composition map as the third subject region map. The image processing apparatus 100 according to the second exemplary embodiment can reduce the generation of the unnatural artifact in the image in the region-specific image processing by using the third subject region map for the region-specific image processing.

Figure 8:
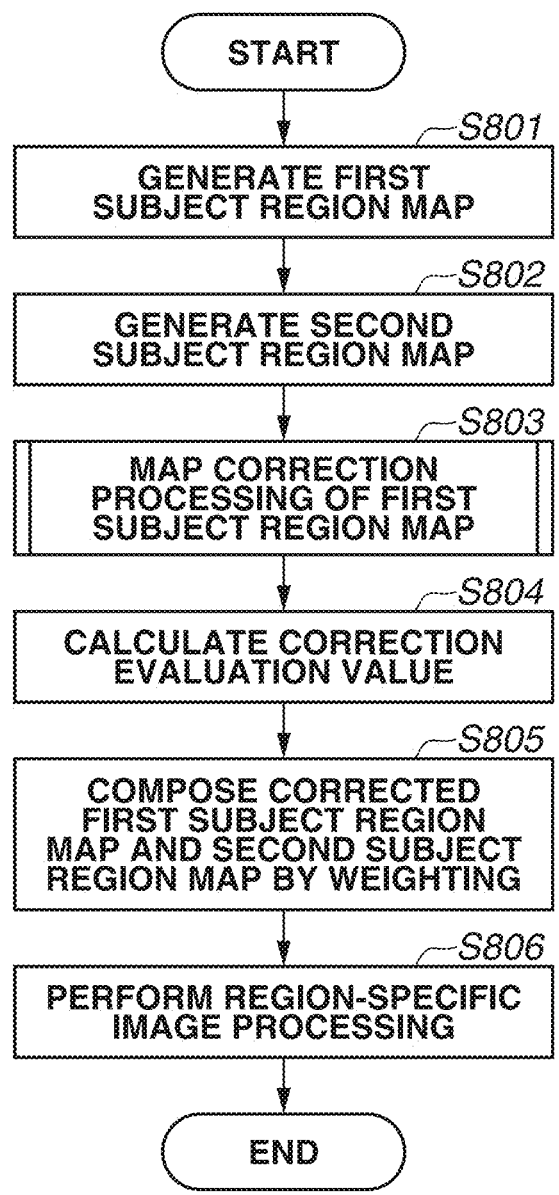
FIG. 8 is a flowchart illustrating image processing according to a second exemplary embodiment.

FIG. 8 is a flowchart illustrating a procedure of processing in the region correction unit 111 according to the second exemplary embodiment. Since processing from steps S801 to S804 is similar to the processing from steps S601 to S604 in FIG. 6 described above, the description thereof is omitted.

After step S804, the processing proceeds to step S805, and the region correction unit 111 performs weighted composition of the first subject region map generated using the image evaluation value map and corrected and the second subject region map generated without using the image evaluation value map.

Figure 9:
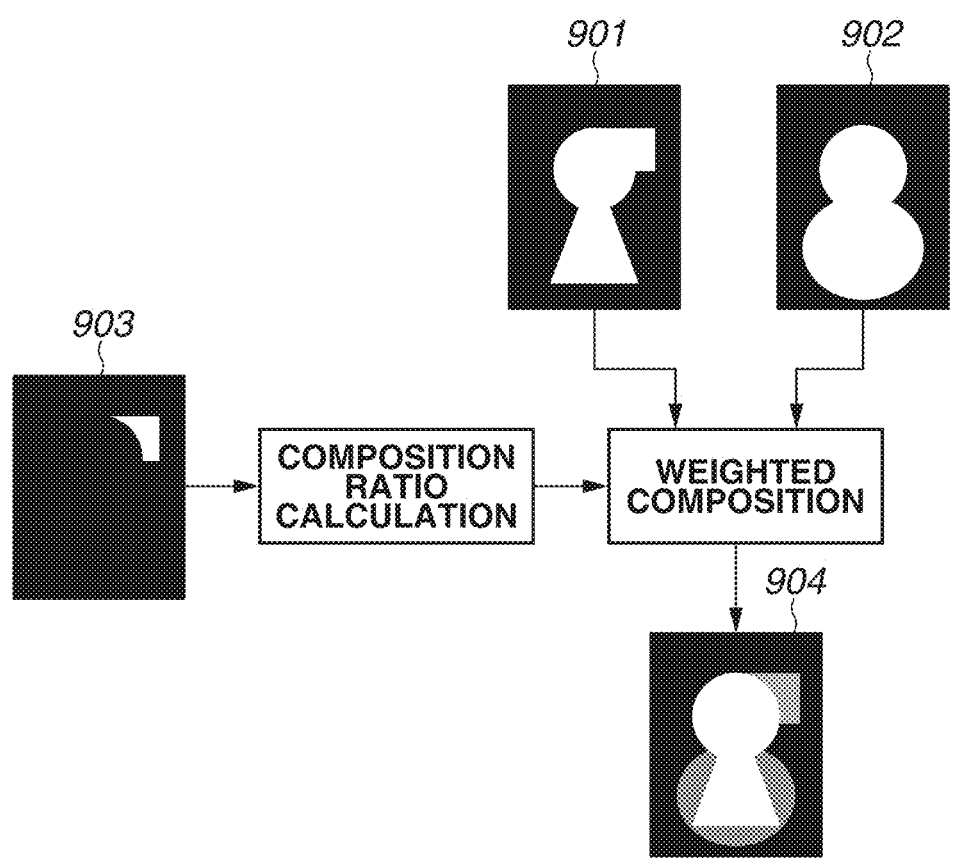
FIG. 9 illustrates an example of weighted composition processing.

This processing is described with reference to FIG. 9. A corrected first subject region map 901 is similar to the corrected first subject region map 701 described with reference to FIG. 7. Further, a second subject region map 902 is similar to the second subject region map 705 described above, and an over-correction region map 903 is similar to the over-correction region map 707.

In the case of the second exemplary embodiment, the region correction unit 111 calculates a composition ratio using the over-correction region map 903. The region correction unit 111 increases the composition ratio of the second subject region map 902 as an area of the over-correction region map 903 is larger. According to the second exemplary embodiment, the composition ratio is calculated using only the area of the over-correction region map 903, but is not limited thereto. For example, the composition ratio may be calculated based on the area of the over-correction region map 903 and the area of the face of the subject.

Next, the region correction unit 111 performs weighted composition of the corrected first subject region map 901 and the second subject region map 902 based on the above-described composition ratio. In this way, a weighted composition map 904 (third subject region map) is obtained.

The processing in step S806 is similar to that in step S608, so that the description thereof is omitted.

As described above, in the case of the second exemplary embodiment, the region correction unit 111 generates the third subject region map by performing weighted composition of the corrected first subject region map and the second subject region map based on a degree of over-correction of the first subject region map. According to the second exemplary embodiment, the generation of the unnatural artifact in the image in the region-specific image processing can be reduced by using the weighted composition map (third subject region map) in the region-specific image processing.

An image processing apparatus 100 according to a third exemplary embodiment of the disclosure is described in detail below with reference to the attached drawings. The configuration according to the third exemplary embodiment is similar to that in FIG. 1 described above, so that the diagrams and the descriptions of the configuration are omitted.

According to the third exemplary embodiment, a case is described in which an under-corrected region is generated in correction processing of a subject region map. In a case of the third exemplary embodiment, a difference is an area value of a region with low reliability in the first subject region map, which is not corrected and is a subject region.

Figures 10A, 10B, 10C:
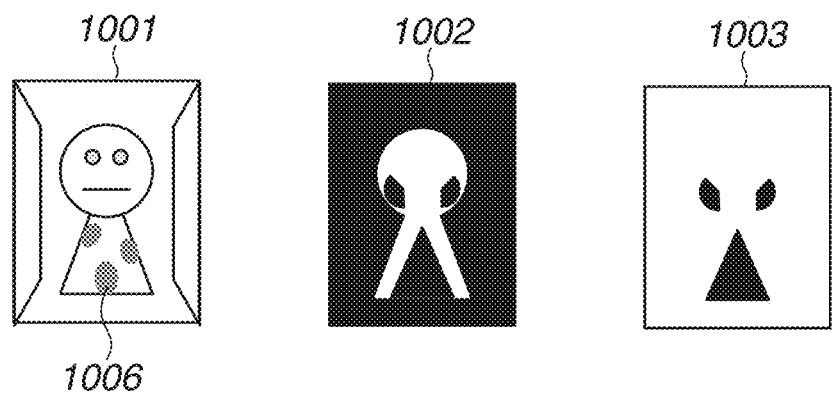
FIGS. 10A to 10E illustrate an example of an image in which under-correction occurs in maps, and the maps.
Figures 10D, 10E:
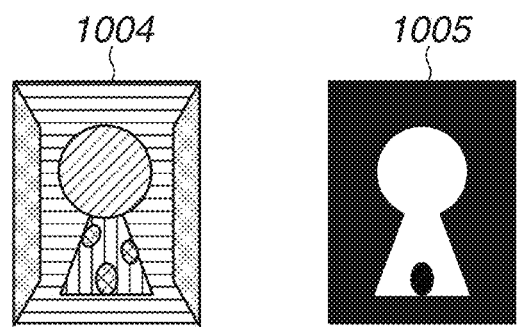

This case is described with reference to FIGS. 10A to 10E. FIG. 10A illustrates an image 1001 similar to the image 201 in FIG. 2A. FIG. 10B illustrates a subject region map 1002 similar to the subject region map 202 in FIG. 2B. FIG. 10C illustrates a reliability map 1003 similar to the reliability map 203 in FIG. 2C. FIG. 10D illustrates a region division result 1004 similar to the region division result 204 in FIG. 2D. FIG. 10E illustrates a corrected subject region map 1005 similar to the corrected subject region map 205 in FIG. 2E. Generation methods are respectively similar to the methods described in FIGS. 2A to 2E, so that the descriptions thereof are omitted.

The examples in FIGS. 10A to 10E are different from the examples described above in FIGS. 2A to 2E in that a pattern 1006 having a color different from the main color of the subject exists in the subject. The pattern 1006 is divided as in the region division result 1004, but the subject region does not exist as in the subject region map 1002. Therefore, the pattern 1006 is not corrected by the correction processing, and under-correction occurs as in the corrected subject region map 1005. Thus, an unnatural image is generated by the region-specific image processing in the later stages.

In the case of the third exemplary embodiment, the region correction unit 111 calculates an under-corrected region as the correction evaluation value (difference) in a case where the first subject region map is corrected. The region correction unit 111 generates the third subject region map by selecting one of the corrected first subject region map and the second subject region map for the region-specific image processing based on the correction (difference). In this way, according to the third exemplary embodiment, the generation of the unnatural artifact in the image in the region-specific image processing can be reduced.

The procedure of processing according to the third exemplary embodiment is described with reference to the above-described flowchart in FIG. 6. However, in the case of the third exemplary embodiment, only the processing for calculating the correction evaluation value performed in step S604 according to the first exemplary embodiment is different. Thus, the description of other processing is omitted.

In the case of the third exemplary embodiment, in step S604, the region correction unit 111 evaluates whether a region to be corrected is corrected. More specifically, in the case of the third exemplary embodiment, an area value of a region that will be the subject region in the second subject region map in the region with the low reliability at the time of generating the first subject region map and that is not corrected is used as the correction evaluation value (difference) for the map correction processing.

Figure 11:
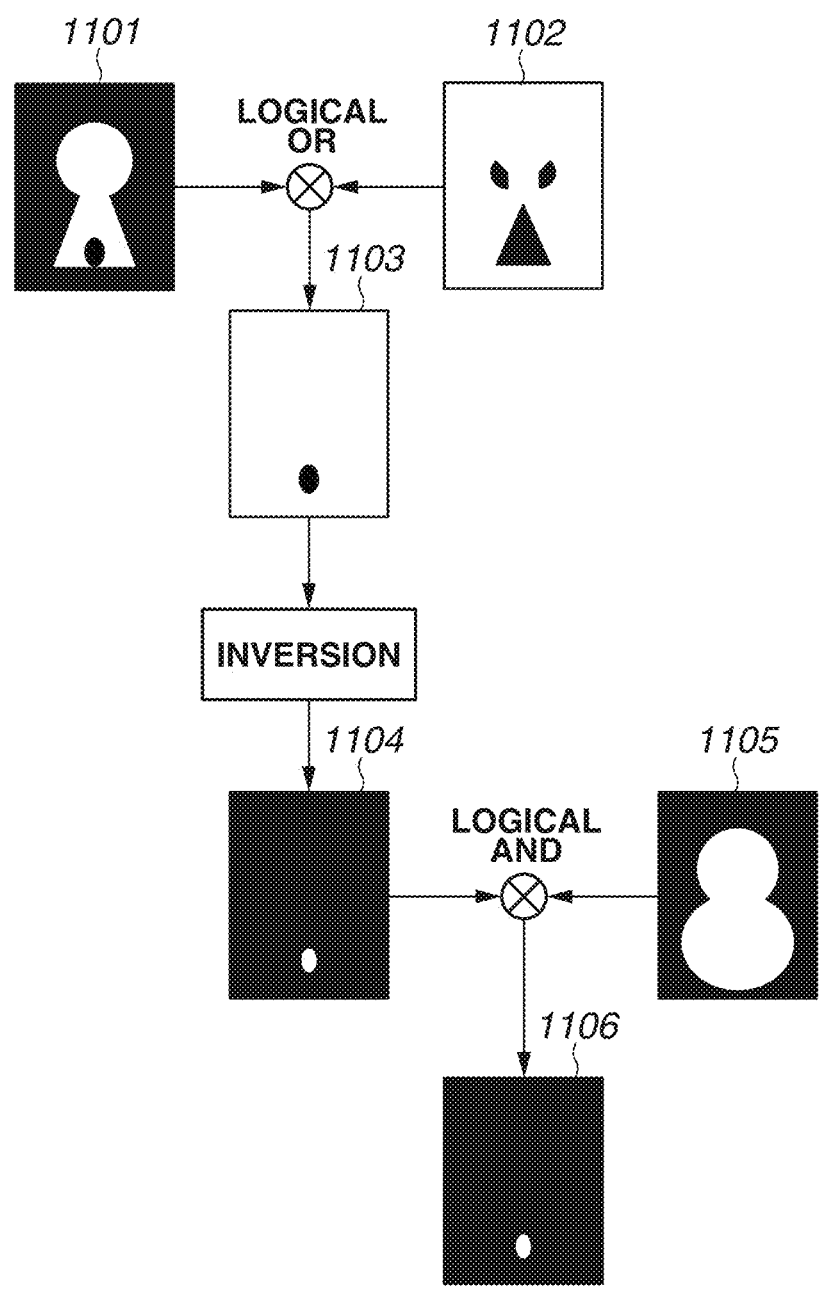
FIG. 11 illustrates calculation of a correction evaluation value according to a third exemplary embodiment.

This processing is described with reference to FIG. 11.

First, the region correction unit 111 calculates a corrected region from a corrected first subject region map 1101. The corrected region is obtained by inverting a map 1103 obtained by performing a logical OR operation (OR operation) on the corrected first subject region map 1101 and a reliability map 1102. In this way, an uncorrected region map 1104 is obtained.

Next, the region correction unit 111 calculates the region to be corrected from the uncorrected region map 1104. The region to be corrected can be obtained by performing the logical AND operation (AND operation) of a second subject region map 1105 and the uncorrected region map 1104. In this way, an under-correction region map 1106 is obtained.

According to the third exemplary embodiment, an area of the under-correction region map is the correction evaluation value (difference) for the map correction processing. Subsequent processing is similar to that according to the first exemplary embodiment, so that the description thereof is omitted.

As described above, according to the third exemplary embodiment, in a case where the first subject region map is not properly corrected, the second subject region map is used in the region-specific image processing, so that the generation of the unnatural artifact in the image in the region-specific image processing can be reduced.

According to the third exemplary embodiment, which of the corrected first subject region map and the second subject region map is used for the region-specific image processing is selected based on the correction evaluation value (difference) as with the first exemplary embodiment. However, the processing is not limited to this. For example, according to the third exemplary embodiment, the corrected first subject region map and the second subject region map may be subjected to weighted composition based on the correction evaluation value (difference), and the weighted composition map may be used for the region-specific image processing as the third subject region map as with the second exemplary embodiment.

According to the third exemplary embodiment, the area of the under-correction region map is used as the correction evaluation value (difference), but a sum or a weighted sum of an area of the over-correction region map used in the first and the second exemplary embodiments and the area of the under-correction region map may be used as the difference (correction evaluation value). In this case, the difference is a value obtained by combining an area value of a region excluding the subject region in the first subject region map from the corrected region and an area value of the subject region in the second subject region map in the area with the low reliability at the time of generating the first subject region map and that is not corrected.

According to each of the first to the third exemplary embodiments described above, an image processing apparatus can be provided capable of reducing unnaturalness of a subject region even if correction processing fails in a main subject region map.

While the exemplary embodiments have been described, the disclosure is not limited to the exemplary embodiments, and various variations and modifications can be implemented without departing from the scope and spirit of the disclosure. According to the above-described exemplary embodiments, the examples in which the image processing apparatus is applied to a digital camera are described. However, the image processing unit 107, the subject detection unit 109, the region extraction unit 110, the region correction unit 111, and the region-specific image processing unit 112 may be separated and configured as, for example, a computer.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-063807, filed Mar. 31, 2020, which is hereby incorporated by reference herein in its entirety.

What is claimed is:

1. An apparatus, comprising:
at least one processor and at least one memory coupled to the at least one processor storing instructions that, when executed by the at least one processor, cause the at least processor to function as:
an obtaining unit configured to obtain image evaluation value distribution corresponding to an image as an image evaluation value map;
a generation unit configured to generate a first subject region map including a subject region extracted from the image using the image evaluation value map;
a map correction unit configured to correct the first subject region map based on a region obtained by dividing the image using at least any one of color distribution information of the image, luminance distribution information of the image, probability distribution information of semantic region division of the image, and distribution information of infrared light reflected by irradiating a subject therewith; and
a processing unit configured to perform correction processing on the image using at least any one of the first subject region map corrected by the map correction unit and a second subject region map generated without using the image evaluation value map,
wherein the processing unit calculates a difference between the first subject region map corrected by the map correction unit and the second subject region map and performs correction processing on the image using the second subject region map more than the first subject region map as the difference is higher.

2. The apparatus according to claim 1,
wherein the map correction unit generates a third subject region map using the second subject region map more than the first subject region map as the difference is higher; and
wherein an image correction unit performs correction processing on the image using the third subject region map.

3. The apparatus according to claim 2, wherein the difference is an area value of a region obtained by excluding a subject region in the second subject region map from the corrected region in the first subject region map.

4. The apparatus according to claim 2, wherein the difference is an area value of a region that is not corrected and has low reliability in the first subject region map and is to be a subject region in the second subject region map.

5. The apparatus according to claim 2, wherein the difference is a value combining an area value of a region obtained by excluding the subject region in the second subject region map from the corrected region in the first subject region map and an area value of a region that is not corrected and has low reliability in first subject region map and is to be a subject region in the second subject region map.

6. The apparatus according to claim 2, wherein the map correction unit performs, in a case where it is determined that the image is at least one of a low luminance image and a low color saturation image based on at least any one of the color distribution information of the image and the luminance distribution information of the image, tone curve correction on the image and then divides the image subjected to the tone curve correction.

7. The apparatus according to claim 2, wherein the map correction unit extracts color of a specific subject from the image, divides a region corresponding to the extracted color, and then divides a remaining region.

8. The apparatus according to claim 7, wherein the map correction unit extracts, in a case where the subject is a person, skin color of the subject, divides a region corresponding to the skin color of the subject from the image, and then divides a remaining region.

9. The apparatus according to claim 2, wherein the map correction unit does not correct a region with an area more than or equal to a predetermined upper limit value in the divided regions.

10. The apparatus according to claim 2, wherein the map correction unit corrects, in a case where an area value of a subject region in the first subject region map is more than or equal to a predetermined area value in the divided regions, the subject region in the first subject region map.

11. The apparatus according to claim 10, wherein the predetermined area value is changed depending an area of the divided region.

12. The apparatus according to claim 11, wherein the predetermined area value is, in a case where the area of the divided region is less than or equal to a predetermined lower limit value, a fixed value.

13. The apparatus according to claim 1, wherein the image evaluation value map includes any of defocus amount distribution information, color distribution information, luminance distribution information, parallax distribution information, distance distribution information, probability distribution information for semantic region division, infrared distribution information, and optical flow distribution information.

14. A method comprising:
obtaining image evaluation value distribution corresponding to an image as an image evaluation value map;
generating a first subject region map including a subject region extracted from the image using the image evaluation value map;
correcting the first subject region map based on a region obtained by dividing the image using at least any one of color distribution information of the image, luminance distribution information of the image, probability distribution information of semantic region division of the image, and distribution information of infrared light reflected by irradiating a subject therewith; and
performing correction processing on the image using at least any one of the first subject region map corrected by the correcting and a second subject region map generated without using the image evaluation value map,
wherein, in the correction processing, a difference between the first subject region map corrected by the correcting and the second subject region map is calculated and the correction processing on the image using the second subject region map is performed more than the first subject region map as the difference is higher.

15. The method according to claim 14, further comprising:
generating a third subject region map using the second subject region map more than the first subject region map as the difference is higher; and
performing correction processing on the image using the third subject region map.

16. A non-transitory computer-readable storage medium storing a program for causing a computer to execute a method comprising:
obtaining image evaluation value distribution corresponding to an image as an image evaluation value map;
generating a first subject region map including a subject region extracted from the image using the image evaluation value map;
correcting the first subject region map based on a region obtained by dividing the image using at least any one of color distribution information of the image, luminance distribution information of the image, probability distribution information of semantic region division of the image, and distribution information of infrared light reflected by irradiating a subject therewith; and
performing correction processing on the image using at least any one of the first subject region map corrected by the correcting and a second subject region map generated without using the image evaluation value map,
wherein, in the correction processing, a difference between the first subject region map corrected by the correcting and the second subject region map is obtained and the correction processing is performed on the image using the second subject region map more than the first subject region map as the difference is higher.

17. The non-transitory computer-readable storage medium according to claim 16, further comprising:
generating a third subject region map using the second subject region map more than the first subject region map as the difference is higher; and
performing correction processing on the image using the third subject region map.

* * * * *